United States Patent [19]  [11] 3,898,225
Haugwitz et al.  [45] Aug. 5, 1975

[54] N-SUBSTITUTED PURINES
[75] Inventors: Rudiger D. Haugwitz, Titusville; Venkatachala L. Narayanan, Hightstown, both of N.J.
[73] Assignee: E. R. Squibb & Sons, Inc., Princeton, N.J.
[22] Filed: June 7, 1974
[21] Appl. No.: 477,527

[52] U.S. Cl............ 260/252; 260/243 R; 260/253; 260/254; 424/232; 424/246; 424/253
[51] Int. Cl.²............ C07D 279/06; C07D 473/00; C07D 473/40
[58] Field of Search......... 260/243 R, 252, 253, 254

[56] References Cited
UNITED STATES PATENTS
2,721,866  10/1955  Hitchings et al.................... 260/252

Primary Examiner—Donald G. Daus
Assistant Examiner—Anne Marie T. Tighe
Attorney, Agent, or Firm—Lawrence S. Levinson; Merle J. Smith; Donald J. Barrack

[57] ABSTRACT
Novel N-substituted purines having the structure

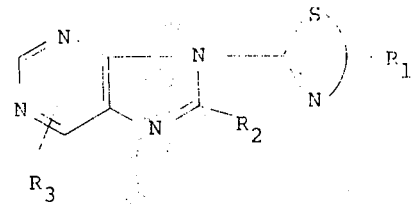

wherein $R_1$ is hydrogen, alkyl or aryl, $R_2$ is hydrogen, alkylthio, benzylthio, or mercapto, and $R_3$ is hydrogen, halogen, or alkyl, and the pharmaceutically acceptable acid-addition salts thereof, possess useful blood pressure lowering activity.

12 Claims, No Drawings

N-SUBSTITUTED PURINES

SUMMARY OF THE INVENTION

N-Substituted purines having the formula

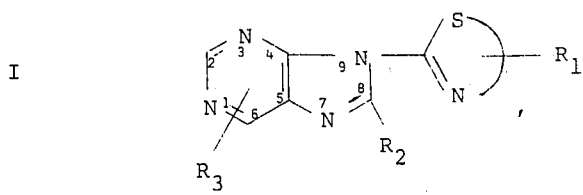

I and the pharmaceutically acceptable acid-addition salts thereof, have useful blood pressure lowering activity. In formula I, and throughout the specification, the symbols are as defined below:

$R_1$ can be hydrogen, alkyl, or aryl, and

can be a 5- or 6-membered ring, i.e.,

or

;

$R_2$ can be hydrogen, alkylthio, benzylthio, or mercapto; and $R_3$ can be hydrogen, halogen, or alkyl.

The term "alkyl," as used throughout the specification, refers to straight or branched chain alkyl groups having 1 to 8 carbon atoms; alkyl groups of 1 to 3 carbon atoms are preferred.

The term "aryl," as used throughout the specification, refers to phenyl and phenyl mono- or di-substituted with halogen or alkyl. The preferred aryl groups are phenyl and mono-substituted phenyl; phenyl is the most preferred.

The term "halogen," as used throughout the specification, refers to fluorine, chlorine, bromine and iodine. Chlorine and bromine are the preferred halogens.

DETAILED DESCRIPTION OF THE INVENTION

The N-substituted purines of formula I can be prepared from purines having the formula

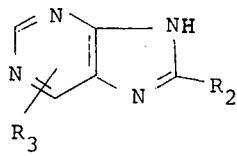

Reaction of a purine of formula II with sodium or potassium hydride yields a purine salt of the formula

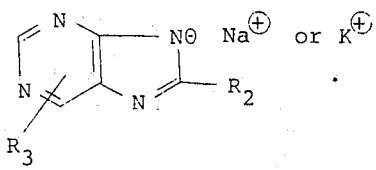

The reaction can be run in a non-protic organic solvent such as an aromatic hydrocarbon (e.g., benzene or toluene) or an ether (e.g., ethyl ether, glyme, or dioxane) at a temperature of from about 0°C to 150°C for about 1 hour to 24 hours. A molar ratio of purine to metal hydride of from about 1:1 to about 1:1.5 is preferred.

Compounds of formula I are prepared by reacting a purine salt of formula III with a haloalkyl (haloethyl or halopropyl) isothiocyanate having the formula

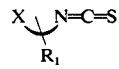

IV wherein X can be chlorine or bromine.

The reaction can be run in a non-protic organic solvent (of the type described above) a temperature of from about 0°C to 150°C for about 1 hour to 24 hours, preferably under reflux conditions. The molar ratio of purine to haloalkyl isothiocyanate can preferably range from about 1:1 to 1:2.

In a preferred method for preparing the compounds of this invention, the haloalkyl isothiocyanate is added to the same reaction medium used to prepare the purine salt.

Haloalkyl isothiocyanates of formula IV are known. They can be readily prepared by reacting thiophosgene with the corresponding haloalkyl (haloethyl or halopropyl) amine having the formula

V

Additional routes for the preparation of isothiocyanates of formula IV are described in Houben-Weyl's *Methoden Der Organischen Chemie*, Vol. 9, G. Thieme Verlag, Suttgart (1955).

Compounds of formula I wherein $R_1$ is hydrogen are preferred.

Compounds of formula I wherein the $R_3$ group is hydrogen are preferred.

The compounds of formula I form acid addition salts with inorganic and organic acids. These acid addition salts frequently provide useful means for isolating the products from reaction mixtures by forming the salt in a medium in which it is insoluble. The free base may then be obtained by neutralization, e.g., with a base such as sodium hydroxide. Any other salt may then be formed from the free base and the appropriate inorganic or organic acid. Illustrative are the hydrohalides, especially the hydrochloride and hydrobromide which are preferred, sulfate, nitrate, phosphate, borate, acetate, tartrate, maleate, citrate, succinate, benzoate, ascorbate, salicylate, methanesulfonate, benzenesulfonate, toluenesulfonate and the like.

The N-substituted purines of formula I, and the pharmaceutically acceptable acid addition salts thereof, are useful as hypotensive agents in mammals, e.g., domestic animals such as dogs, cats, etc. Daily doses of from 5 to 50 mg/kg, preferably about 5 to 25 mg/kg can be administered in single or divided doses.

The active compounds of the present invention are administered orally, for example, with an inert diluent or with an assimilable edible carrier, or they may be enclosed in hard or soft gelatin capsules, or they may be compressed into tablets, or they may be incorporated directly with the food of the diet. For oral therapeutic administration, the active compounds of this invention may be incorporated with excipients and used in the form of tablets, troches, capsules, elixirs, suspensions, syrups, and the like. Such compositions and preparations should contain at least 0.1% of active compound. The percentage in the compositions and preparations may, of course, be varied and may conveniently be between about 5 to about 75% or more of the weight of the unit. The amount of active compound in such therapeutically useful compositions or preparations is such that a suitable dosage will be obtained. Preferred compositions or preparations according to the present invention are prepared so that an oral dosage unit form contains between about 5 and 250 milligrams of active compound.

The tablets, troches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as magnesium stearate; and a sweetening agent such as sucrose, lactose or saccharin may be added. When the dosage unit form is a capsule, it may contain in addition to materials of the above type a liquid carrier such as a fatty oil. Various other materials may be present as coatings or to otherwise modify the physical form of the dasage unit, for instance, tablets, pills, or capsules may be coated with shellac, sugar, or both. A syrup or elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and non-toxic in the amounts employed.

The following examples are specific embodiments of this invention.

EXAMPLE 1

9-(4,5-Dihydro-2-thiazolyl)-9H-purine

A mixture of 1 g of purine, 150 ml of dry glyme and 0.5 g of sodium hydride (50% oil dispersion) is refluxed for 24 hours. To the dispersion there is added 1 g of 2-chloroethyl isothiocyanate and reflux is continued for 24 hours. The mixture is filtered hot and the filtrate evaporated to yield 1.2 g of residue. Crystallization from chloroform-petroleum ether yields the pure compound, melting point 199°–200°C.

EXAMPLE 2

6-Chloro-(4,5-dihydro-2-thiazolyl)-9H-purine

A mixture of 3 g of 6-chloropurine, 160 ml of dry glyme, and 1.2 g of sodium hydride (50% mineral oil dispersion) is refluxed for 24 hours. Then, 2.5 g of 2-chloroethyl isothiocyanate is added and reflux is continued for 24 hours. The solvent is evaporated, water is added and the pH is adjusted to 7 using acetic acid. The precipitated solid is filtered off and crystallized from methanol to yield 0.8 g of product, melting point 198°–200°C.

EXAMPLE 3

9-(4,5-Dihydro-2-thiazolyl)-9H-purine-8-thiol

A mixture of 4.6 g of 8-mercaptopurine, 3.6 g of sodium hydride (50% mineral oil dispersion) and 200 ml of dry glyme is refluxed for 24 hours. Then, 7.32 g of 2-chloroethylisothiocyanate is added and reflux is continued for an additional 24 hours.

The solvent is evaporated, methanol is added and the solvent is again evaporated. The residue is extracted with ether-petroleum ether. The residue is treated with water and the undissolved material is filtered off. The filtrate, on acidification, yields a precipitate which is filtered off and crystallized from 50 ml of methanol to yield 0.5 g of product, melting point 231°–233°C.

EXAMPLE 4

8-(Methylthio)-9-(4,5-dihydro-2-thiazolyl)-9H-purine

A mixture of 5 g of 8-(methylthio)purine, 200 ml of glyme and 2 g of sodium hydride (50% dispersion) is refluxed for 24 hours. To the suspension is added 5 g of 2-chloroethyl isothiocyanate and reflux is continued for 24 hours. The solvent is evaporated and a small amount of methanol is added to destroy any unreacted sodium hydride. The crude product is crystallized from acetonitrile to yield 4g of product, melting point 202°–203°C.

EXAMPLES 5 – 8

Following the procedure of Example 1, but substituting the purine listed in column I below for the purine starting material, the compound in column II is obtained.

| Example | Column I | Column II |
| --- | --- | --- |
| 5 | 6-ethylpurine | 6-ethyl-9-(4,5-dihydro-2-thiazolyl)-9H-purine |
| 6 | 2-bromopurine | 2-bromo-9-(4,5-dihydro-2-thiazolyl)-9H-purine |
| 7 | 2-methylpurine | 2-methyl-9-(4,5-dihydro-2-thiazolyl)-9H-purine |
| 8 | 8-(benzylthio)-6-chloropurine | 8-benzylthio-6-chloro-9-(4,5-dihydro-2-thiazolyl)-9H-purine |

EXAMPLES 9 – 15

Following the procedure of Example 1, but substituting the purine listed in column I for the purine starting material and the haloalkyl isothiocyanate listed in column II for 2-chloroethyl isothiocyanate, the compound listed in column III is obtained.

| Example | Column I | Column II | Column III |
| --- | --- | --- | --- |
| 9 | 2-chloropurine | 3-chloropropyl isothiocyanate | 2-chloro-9-(5,6-dihydro-4H-1,3-thiazin-2-yl)-9H-purine |
| 10 | 6-bromopurine | 3-chloropropyl isothio- | 6-bromo-9-(5,6-dihydro-4H-1,3- |

| Example | Column I | Column II | Column III |
|---|---|---|---|
| | | cyanate | thiazin-2-yl)-9H-purine |
| 11 | 2,6-dichloropurine | 3-chloropropyl isothio-cyanate | 2,6-dichloro-9-(5,6-dihydro-4H-1,3-thiazin-2-yl)-9H-purine |
| 12 | purine | 3-chloro-1-methylpropyl isothiocyanate | 9-(6-methyl-5,6-dihydro-4H-1,3-thiazin-2-yl)-9H-purine |
| 13 | 6-methylpurine | 2-chloro-1-methylethyl isothiocyanate | 6-methyl-9-(5-methyl-4,5-dihydro-2-thiazolyl)-9H-purine |
| 14 | purine | 3-chloro-3-phenylpropyl isothiocyanate | 9-(4-phenyl-5,6-dihydro-4H-1,3-thiazin-2-yl)-9H-purine |
| 15 | purine | 2-chloro-2-phenylethyl isothiocyanate | 9-(4-phenyl-4,5-dihydro-2-thiazolyl)-9H-purine |

What is claimed is:

1. A compound having the structure

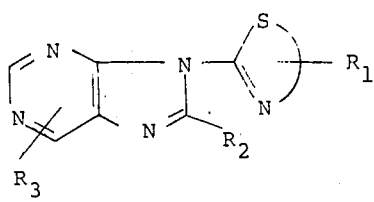

or a pharmaceutically acceptable salt thereof, wherein $R_1$ is hydrogen, alkyl or aryl and the group

is

or

$R_2$ is hydrogen, alkylthio, benzylthio, or mercapto; and $R_3$ is hydrogen, halogen or alkyl; and wherein alkyl is alkyl having 1 to 8 carbon atoms and aryl is phenyl or phenyl mono- or di-substituted with halogen or alkyl.

2. A compound in accordance with claim 1 having the structure

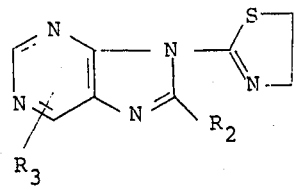

3. A compound in accordance with claim 1 having the structure

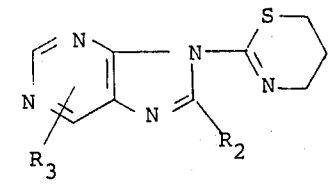

4. A compound in accordance with claim 1 wherein $R_1$ is hydrogen.

5. A compound in accordance with claim 1 wherein $R_2$ is hydrogen.

6. A compound in accordance with claim 1 wherein $R_2$ is alkylthio.

7. A compound in accordance with claim 1 wherein $R_2$ is benzylthio.

8. A compound in accordance with claim 1 wherein $R_2$ is mercapto.

9. The compound in accordance with claim 1 having the name 9-(4,5-dihydro-2-thiazolyl)-9H-purine.

10. The compound in accordance with claim 1 having the name 6-chloro-9-(4,5-dihydro-2-thiazolyl)-9H-purine.

11. The compound in accordance with claim 1 having the name 9-(4,5-dihydro-2-thiazolyl)-9H-purine-8-thiol.

12. The compound in accordance with claim 1 having the name 8-(methylthio)-9-(4,5-dihydro-2-thiazolyl)-9H-purine.

* * * * *

UNITED STATES PATENT AND TRADEMARK OFFICE
CERTIFICATE OF CORRECTION

PATENT NO. : 3,898,225
DATED : August 5, 1975
INVENTOR(S) : Rudiger D. Haugwitz and Venkatachala L. Narayanan It is certified that error appears in the above-identified patent and that said Letters Patent are hereby corrected as shown below:

Column 3, line 37, "dasage" should read --dosage--.
Column 5, in claim 1 the structural formulas should read:

-- 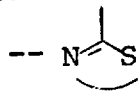

is 

or 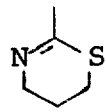 ;

Signed and Sealed this sixteenth Day of December 1975

[SEAL]

Attest:

RUTH C. MASON
*Attesting Officer*

C. MARSHALL DANN
*Commissioner of Patents and Trademarks*